United States Patent [19]
Kunz

[11] 3,802,567
[45] Apr. 9, 1974

[54] BAFFLE-PLATE OUTLET MEMBER

[75] Inventor: Gerhard Kunz, Essen-Kupferdreh, Germany

[73] Assignee: M.A.N. Warme- und Lufttechnik GmbH, Nurnberg, Germany

[22] Filed: Apr. 28, 1972

[21] Appl. No.: 248,644

[30] Foreign Application Priority Data
May 3, 1971 Germany............................ 2121626

[52] U.S. Cl..................... 210/189, 210/268, 55/390
[51] Int. Cl............................................. B01d 33/30
[58] Field of Search............ 210/33, 189, 263, 268, 210/283; 55/77, 78, 79, 390

[56] References Cited
UNITED STATES PATENTS
3,405,508 10/1968 Peters et al......................... 55/77 X
2,676,668 4/1954 Lindsay............................... 55/390
3,554,376 1/1971 Kunz................................... 210/189

FOREIGN PATENTS OR APPLICATIONS
908,486 3/1954 Germany............................ 55/390

*Primary Examiner*—John Adee
*Assistant Examiner*—Ivars Cintins
*Attorney, Agent, or Firm*—Holman & Stern

[57] ABSTRACT

A baffle-plate outlet member suitable for a baffle-plate of a reaction column, e.g. an ion exchange column. The outlet member comprises an open-ended downpipe connected to a trough arranged spaced below the lower end of the downpipe. The base of the trough has openings laterally spaced from the lower end of the downpipe so that the flow direction of material falling down through the downpipe is changed before the material leaves the trough.

7 Claims, 4 Drawing Figures

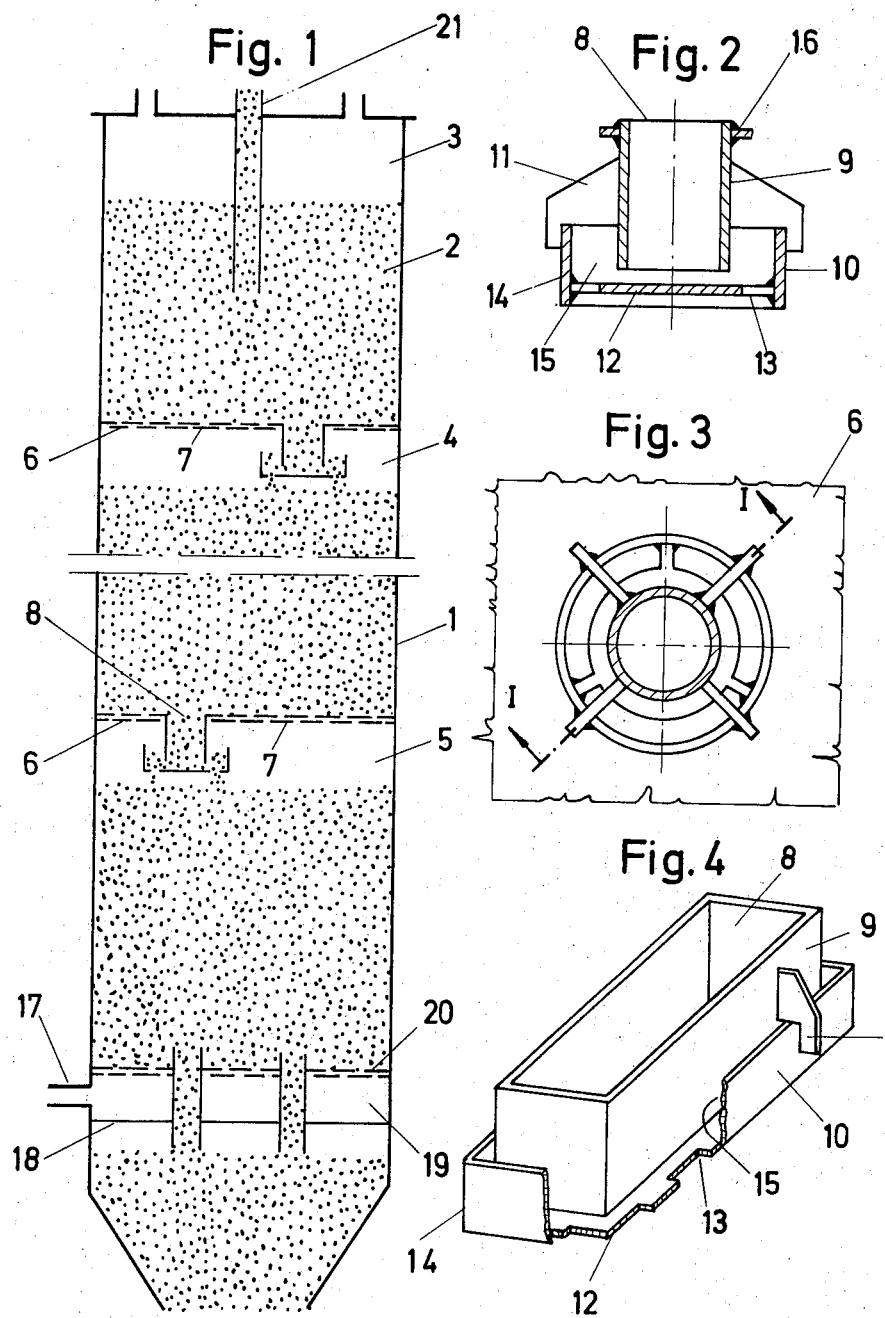

3,802,567

BAFFLE-PLATE OUTLET MEMBER

BACKGROUND OF THE INVENTION

The invention relates to a baffle-plate outlet member suitable for a baffle-plate of a reaction column, particularly but not exclusively of an ion exchange column. In such a column, granular exchange material moves in counter-flow to a fluid, i.e., a liquid or a gas, so as to react continuously in reaction chambers in the column. The reaction chambers are defined at their top and bottom by baffle-plates having a narrow aperture for the rising fluid, and at least one larger opening for the exchange material trickling downwardly through the reaction chambers. Normally, the baffle plates are perforated to allow the upward flow of fluid.

PRIOR ART

In a known exchange column of this type (see U.K. Pat. specification No. 1,202,718) perforated baffle plates are provided with open-ended downpipes of such a length that their inlets, i.e., their upper ends, extend into a fluidized bed of the ion exchange material kept in a state of fluidization and their outlets, i.e., their lower ends, reach to just over the lower baffle plate. By this downpipe arrangement the ion exchange material is fed into the bottom of the reaction chamber and from there rises upwards and reacts with the fluid, and then passes through the inlet end of the downpipe to emerge just above the baffle plate of the adjacent lower reaction chamber. In order to keep the fluidized bed in each reaction chamber in a fluidized state, and thereby to ensure a good and relatively rapid exchange between the fluid and ion exchange material, a large number of downpipes are mounted in the baffle plates depending on the size of the exchange column. From tests it has been found that with a column having a diameter of approximately 1.60 meters about 24 downpipes are mounted in each baffle-plate. The provision of such a large number of downpipes is a considerable disadvantage, particularly if different exchange reactions are to be effected and accordingly different column constructions are required, and even more disadvantageous if the through-put capacity of the column is increased or the column diameter is enlarged.

SUMMARY OF THE INVENTION

The invention provides a baffle-plate outlet member comprising open-ended downpipe means, and trough means attached to said downpipe means and spaced from the lower open end thereof and means defining openings in said trough means arranged laterally of said lower open end of said downpipe means, whereby the direction of flow of material passing down through said downpipe means is charged before the material leaves said trough means.

Through this arrangement of the tray and in particular of the drop shaft for the exchange material a tray is produced which has a particular quality of flatness. By this short construction of the drop shaft and of the cup attaching to it, it is very easily possible to divide the exchange of a column into a greater number of reaction chambers with the result that there is a more thorough mixing of the ion exchange material with the medium to be treated, i.e., liquid or gas, while maintaining the fluidized layer in a state of fluidization. When incorporated into a baffle plate, the baffle-plate outlet member according to the invention provides the further advantage that there are no unused zones in the individual reaction chambers, so that while keeping the exchange column the same size it is possible to have a considerably greater through-put capacity. In addition, a uniform exchange space is obtained in all the reaction chambers so that there are hardly any areas of the space available in which the exchange reaction is not so intensive.

Tests using the baffle-plate outlet member according to the invention have furthermore shown that by the uniform feeding of the exchange material from the top into a reaction chamber and the simultaneous withdrawal of the material from the chamber from the bottom, uniform thickness of the reaction layer, for instance of the fluidized bed is obtained, which furthermore means through-put of a uniformly good quality product and thus a good degree of efficiency.

Preferably, outwardly-extending means are provided on the downpipe means connecting said downpipe means to said trough means.

Consequently, a throttling member is produced which allows the ion exchange material to pass through downwardly and prevents the liquid from rising up through the trough.

Preferably, a fluidized bed space is defined by said upstanding wall means and the peripheral surface of the downpipe means.

By the creation of a fluidized bed in the vicinity of the outlet of the exchange material from the downpipe, there is a build-up in counterflow to the outlet flow, which enables the dosing of the outlet of the exchange material dropping from the top downwardly to take place without special auxiliary means. The fluidized bed chamber provides the further advantage that it is possible to have a more or less high discharge flow in exchange material corresponding to the degree of fluidization so that the overflow of the exchange material from one reaction chamber into the chamber lying below is controlled automatically by the actual degree of fluidization, and this exchange mass is prevented from mixing again with the exchange mass in the reaction chamber above it.

Preferably, flange means are provided on the periphery of the downpipe means for fastening the outlet member in a corresponding aperture of a baffle plate.

The invention will now be described with reference to two embodiments shown diagrammatically by way of example in the accompanying draw, wherein:

BRIEF DESCRIPTION OF THE DRAWINGS

FIG. 1 is a vertical section of an exchange column showing two baffle-plate outlet members, FIG. 2 is an enlarged vertical section of a circular baffle-plate outlet member taken along the line I—I of FIG. 3, the view looking in the direction of the arrows, FIG. 3 is a plan view of the baffle-plate outlet member of FIG. 2, and FIG. 4 is an enlarged perspective view of a rectangular baffle-plate outlet member.

DETAILED DESCRIPTION OF THE INVENTION

In FIG. 1, an exchange column 1, which is used for treating a liquid by means of a granular exchange material 2, is divided into reaction chambers 3 to 5 by intermediate baffle plates or trays 6. The intermediate plates 6 have perforations 7 for the liquid rising upwardly through the column 1, and at least one aperture 8 for the granular exchange material 2 trickling downwardly through the column 1. Each aperture 8 is provided with a baffle-plate outlet member consisting of an open-ended downpipe 9 extending downwardly from the respective baffle plate 6 and a trough 10 surrounding, but spaced from, the lower end, i.e., outlet, of the downpipe 9.

In FIGS. 2 and 3, the trough 10 is circular. The trough 10 is connected to the downpipe 9 by lugs 11, but may of course be connected by any other suitable means. The trough 10 has a base 12 provided with peripheral arcuate-shaped openings 13 for the ion exchange material 2, and an upstanding circular wall 14. There is a free space between the base 12 and the lower end of the downpipe 9. There is a further free space between the wall 14 and the outer peripheral surface of the downpipe 9 and it is this further free space that forms a so-called fluidization chamber 15.

The upper end of the downpipe 9 has an annular flange 16 by which the down pipe 9 is attached to the baffle plate 6. The openings 13 provided in the base 12 of the circular trough 10 are distributed concentrically around the center of the base 12, and are laterally spaced, i.e., here radially-outwardly spaced, from the lower open end of the downpipe 9 so that the exchange material 2 dropping downwardly through the downpipe 9 is deflected laterally before leaving the trough 10 via the openings 13. In this way, the discharge speed of the exchange medium 2 is throttled with, the degree of throttling being affected by the degree of fluidization in the fluidization chamber 15.

The height of the fluidization bed of the exchange medium 2 is determined by the length of the downpipe 9, and also of the trough 10, with this height terminating approximately at the base 12 of the circular trough 10.

The baffle-plate outlet member, consisting of the downpipe 9 and the circular trough 10 connected thereto, may for instance be made as a one-piece part of plastic material by injection molding, and may be supported directly on the intermediate baffle-plate 6 or by means of an annular flange 16 of the downpipe 9.

The baffle-plate outlet member functions as follows: the fluid to be treated, e.g., a liquid, is fed into a collecting chamber 19 at the bottom of the column 1 through an inlet 17 provided just above an imperforate baffle plate 18 which closes off the bottom of the collecting chamber 19. An upper baffle plate 20, defining the top of the collecting chamber 19, is perforated. The liquid rising upwards from the collecting chamber 19 into the first reaction chamber 5 comes into contact, in the reaction chamber 5, with the ion exchange material 2 trickling downwards. The ion exchange material 2 is supplied to the top of column 1 through a pipe 21 and flows from the top to the bottom of the column 1 through the separate reaction chambers 3 to 5. The material 2 leaves the bottom of the reaction chambers 3 and 4 through the aperture 8 and the downpipe 9 in counterflow to the upwardly rising liquid entering the reaction chambers 4 and 3 through the perforations 7 of the baffle plates 6. The downwardly-trickling ion exchange material 2 passes via the peripheral opening of the respective downpipe 9 and the orifices 13 in the base 12 of the respective annular trough 10 into the reaction chambers 4 and 5 lying below, where it is subjected to renewed ion exchange with the upwardly flowing liquid. The exchange reaction between the ion exchange material 2 and the liquid continues in accordance with the number of the reaction chambers. The column 1 may be provided with two or more intermediate baffle plates 6 and may be equipped correspondingly with three or more reaction chambers. Furthermore, if the diameter of the column 1 is sufficiently large, each intermediate baffle plate 6 may be provided with two or more baffle-plate outlet members instead of only one as shown in the drawing.

Tests with the above-described baffle-plate outlet member have shown that with a column diameter of approximately 1.6 meters one baffle-plate outlet member in each intermediate baffle plate 6 provides a throughput capacity of exchange material of approximately 600 liters/per hour. Owing to the fact that the baffle-plate outlet members are comparatively short they can be arranged right under the intermediate baffle plate 6 concerned, thus allowing a considerably larger reaction chamber and a consequent gain in reaction height.

The use of the above-described baffle-plate outlet member is not restricted to ion exchange columns, in which a granular exchange material is used, but can also be used for in reaction columns for reaction between liquids or gases and other granular materials e.g., catalyst which, for instance, accelerate reactions between gases.

Provided the construction of the column 1 and thus of the baffle plates 6 permits, other shapes of baffle-plate outlet members are possible, e.g., square, rectangular or any other polygonal construction instead of being circular.

A rectangular baffle outlet member is shown in perspective in FIG. 4 in which the baffle-plate outlet member differs from that shown in FIGS. 2 and 3 only in that the downpipe 9' and the trough 10' have a rectangular cross section. Here, also, the trough 10' has a base 12' with orifices 13', and upstanding walls 14', the downpipe 9' being connected to the trough 10' by means of lugs 11'. This rectangular baffle-plate outlet member is particularly suitable for a high through-put of ion exhange material 2.

I claim:

1. A reaction column for treating a fluid with solid material in which the column is provided with a base and a top, comprising fluid inlet means adjacent the base of the column, solid material inlet means adjacent the top of the column, a plurality of vertically-spaced baffle plates within the column defining reaction chambers therebetween, each baffle plate having perforations therein to allow upward flow of the fluid therethrough and prevent downward flow of the solid material therethrough, each baffle having an aperture therein, a downpipe having a lower end, said downpipe depending from the aperture to permit a downward flow therethrough of the solid material in counterflow to the fluid, trough means attached to the downpipe, said trough means having a base and a side wall, said base being spaced from the lower end of the downpipe, a solids deflecting portion of the base extending laterally beyond the lower end of the downpipe, and the base laterally of the solids deflecting portion having apertures therein whereby the direction of flow of material passing down through the downpipe is changed before the material passes through the apertures in the base of the trough means.

2. The reaction column as claimed in claim 1, further including outwardly extending lug means on the downpipe attaching the downpipe to the trough means.

3. The reaction column as claimed in claim 1 in which a fluidized bed space is defined by the side wall of the trough means and the outer periphery of the downpipe.

4. The reaction column as claimed in claim 3 in which said apertures in the base are adjacent the side wall of the trough means.

5. The reaction column as claimed in claim 1 in which said downpipe and trough means are of one piece plastic material.

6. The reaction column as claimed in claim 1 in which the downpipe and trough means each have a circular cross section.

7. The reaction column as claimed in claim 1 in which the downpipe and trough means each have a rectangular cross section.

* * * * *